United States Patent

[11] 3,596,630

| [72] | Inventor | Walter E. Edelman<br>Minneapolis, Minn. |
| --- | --- | --- |
| [21] | Appl. No. | 14,915 |
| [22] | Filed | Feb. 27, 1970 |
| [45] | Patented | Aug. 3, 1971 |
| [73] | Assignee | Honeywell Inc.<br>Minneapolis, Minn. |

[54] CALIBRATING KNOB FOR CONTROL DEVICE
6 Claims, 4 Drawing Figs.

[52] U.S. Cl. ........................................ 116/124,
    73/336, 74/553, 116/133
[51] Int. Cl. ........................................ G09f 9/00
[50] Field of Search ........................................ 116/115,
    124, 129, 129 A, 129 B, 133, DIG. 6; 73/17 A,
    335, 336, 344; 200/61.04; 236/44; 74/553

[56] References Cited
UNITED STATES PATENTS

| 2,943,245 | 6/1960 | Ohlheiser | 116/133 UX |
| --- | --- | --- | --- |
| 3,109,412 | 11/1963 | Fuhrman et al. | 116/124 |
| 3,154,051 | 10/1964 | Durst et al. | 116/124 |
| 3,163,729 | 12/1964 | Flagg | 200/61.04 |

*Primary Examiner*—Louis J. Capozi
*Attorneys*—Lamont B. Koontz and Robert S. Craig ABSTRACT: An adjusting knob for a control device, the knob having a pointer that cooperates with a scale on the instrument cover in normal use. If recalibration is desired, the cover is removed to expose indicia on the dial carried by the knob with which the pointer also cooperates. The pointer has a slip friction mounting on the knob to permit its adjustment to a selected one of the indicia on the dial.

INVENTOR.
WALTER E. EDELMAN
BY Robert S. Craig
ATTORNEY.

CALIBRATING KNOB FOR CONTROL DEVICE

The invention is illustrated by a control point adjusting knob for a humidity control suitable for controlling operation of a power humidifier in a forced warm air heating system. The scale is calibrated, not in percent relative humidity, but in outdoor temperature, the indicated setting corresponding to the humidity that can be maintained without excessive frost formation on windows. However, there are differences in window construction and in tendency to frost, and there can be no correct humidity setting for all houses in terms of outdoor temperature. In order to have the proper scale indication for each installation, the knob is provided with a pointer that can be moved to recalibrate the control as necessary. As supplied by the manufacturer, the device is calibrated for an intermediate situation, but by removing the instrument cover a second set of indicia is exposed which indicates appropriate pointer adjustment to provide more or less humidity at the temperature indicated on the main scale. This scale is on the instrument cover which in normal use conceals the recalibrating scale.

IN THE DRAWING

Figure 1:
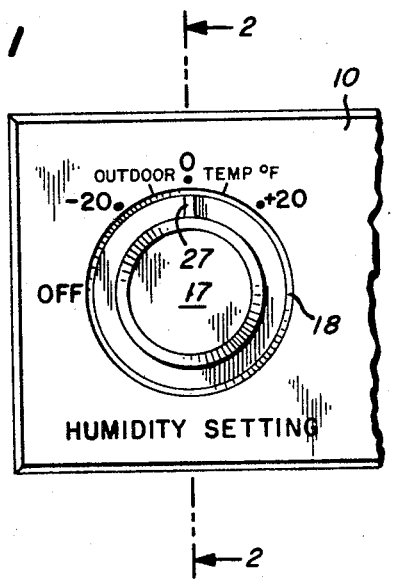
FIG. 1 is an elevation of control device having an adjusting knob and scale.
Figure 2:
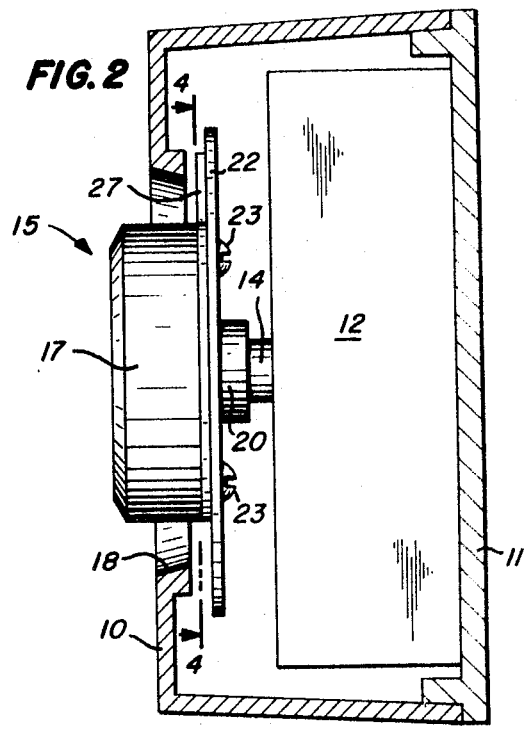
FIG. 2 is a section taken generally on the line 2-2 of FIG. 1.
Figure 3:
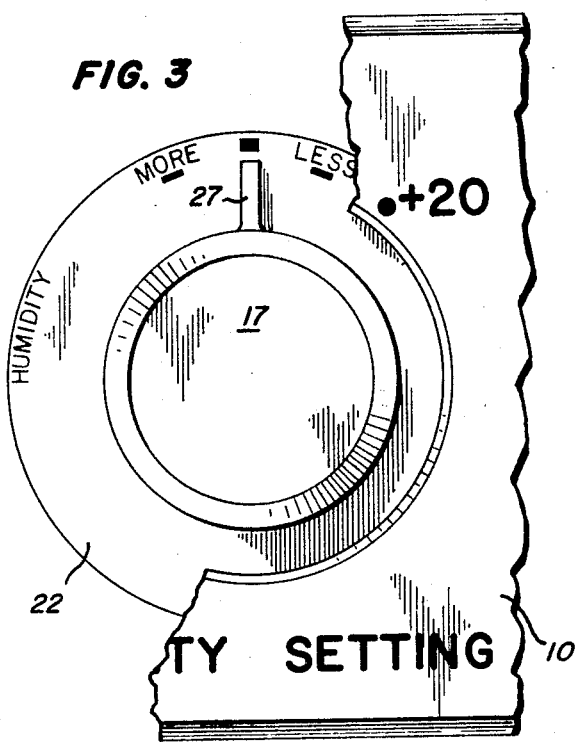
FIG. 3 is a fragmentary elevation as in FIG. 1 but with the cover broken away in part.

As seen in FIGS. 1 and 2, a humidity control suitable for wall mounting has a cover 10 and a base 11 on which is mounted a humidity control mechanism 12 which may be as shown in U.S. Pat. No. 3,163,729 to Flagg. An adjusting shaft 14 extends outwardly from mechanism 12 and carries a knob assembly 15.

Knob assembly 15 comprises a relatively large cylindrical portion 17 that extends outwardly through a circular opening 18 in cover 10, and a smaller integral cylindrical portion 20 that engages shaft 14. Also, a circular dial plate 22 is secured to the back of knob portion 17 by a pair of screws 23 but is held spaced from the back surface by a spacer 24 formed between the larger and smaller cylindrical knob portions. A pointer member 26 having an index 27 is pivotally mounted on a cylindrical portion of spacer 24 and has arcuate portions that are biased radially inwardly to exert a force that provides a slip friction connection permitting the pointer to be moved by maintaining it in adjusted position. The spacer 24 allows only limited adjustment of pointer 26.

As seen in FIG. 1, the front surface of cover 10 has a scale around part of the opening 18 indicating outdoor temperatures from −20° F. to +20° F. In terms of humidity the zero mark may correspond to 25 percent relative humidity if the index 27 is centered on dial 22.

Figure 4:
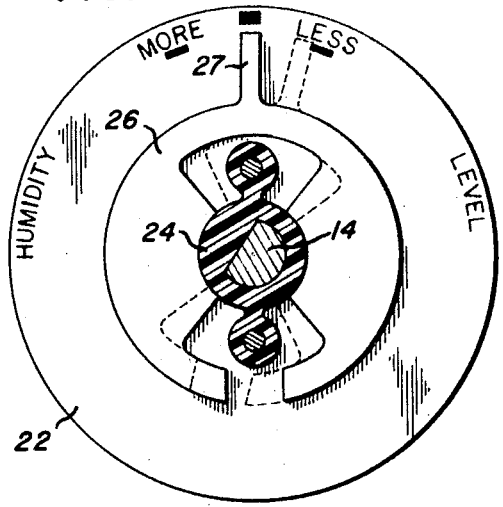
FIG. 4 is a section of the adjusting knob taken on line 4-4 of FIG. 2.

In normal use of the control, cover 10 is in place and the index 27 cooperates only with the indicia of outdoor temperature on the front of cover 10. If it is found either that there is no frost whatever on windows or there is excessive frost it will be desirable to recalibrate the device. To do this the cover 10 is removed exposing the periphery of dial 22 which is provided with indicia of humidity level. It is marked merely with the words "more" and "less," but could be marked in percent humidity if desired. Thus, if it is desired to reduce frosting on the windows, the pointer could be moved to the dotted line position indicated in FIG. 4 to provide less humidity. Then with cover 10 in place the knob 15 would be turned slightly in a counterclockwise direction in order for the index 27 to indicate the same outdoor temperature.

The +20° setting is suitable for higher outdoor temperatures.

While the invention has been illustrated as means for correcting an arbitrary scale to meet existing conditions, the same arrangement obviously could be used to recalibrate a condition responsive control device in the field should it get out of calibration for any reason.

The embodiments of the invention in which an exclusive property or right is claimed are defined as follows:

I claim:

1. A control device comprising, a shaft rotatable to adjust control point, a knob on said shaft, a dial on said knob, said dial having indicia thereon, a normally fixed cover for the portion of said dial having the indicia, a second set of indicia on said cover, and a pointer carried by said knob and cooperating with the second set of indicia to indicate a function of condition value, said cover being removable to expose the first set of indicia, said pointer being movable on said knob to indicate a particular one of said first set of indicia.

2. A device according to claim 1 in which said pointer has a frictional slip engagement with said knob.

3. A control device comprising, a shaft rotatable to adjust control point, a knob on said shaft, a dial secured to said knob, said dial having indicia distributed in an arcuate pattern adjacent the dial periphery, a stationary cover having a circular edge providing an opening therein through which said knob extends and behind which said dial extends, said cover obscuring the indicia on said dial, a set of indicia on said cover, and a pointer carried by said knob and cooperating with the indicia on said cover to indicate a function of condition value selectable by manipulation of said knob, said cover being removable to expose the indicia on said dial, and said pointer being movable on said knob to indicate a selected one of the indicia on said dial.

4. A device according to claim 3 in which said pointer is mounted on said knob for rotation about the shaft axis and frictionally engages said knob.

5. A device according to claim 4 in which the pointer extends radially adjacent the surface of said dial.

6. A device according to claim 3 in which the indicia on said cover are a function of outdoor temperature and the indicia on said dial indicates more or less humidity.